United States Patent [19]
Bazinet

[11] Patent Number: 5,088,226
[45] Date of Patent: Feb. 18, 1992

[54] FISHING LURE WITH ROTATIONAL LATERAL FINS

[76] Inventor: Norman L. Bazinet, 10 Oak St., Guelph, Ontario, Canada, N1G 2M9

[21] Appl. No.: 626,453

[22] Filed: Dec. 12, 1990

[51] Int. Cl.5 ............................................. A01K 85/00
[52] U.S. Cl. ................................ 43/42.03; 43/42.47; 43/42.13
[58] Field of Search ................. 43/42.13, 42.45, 42.46, 43/42.47, 42.03

[56] References Cited

U.S. PATENT DOCUMENTS

| | | | |
|---|---|---|---|
| 2,150,846 | 3/1939 | Rayburn | 43/42.47 |
| 2,613,470 | 10/1952 | Eslinger | 43/42.03 |
| 2,719,377 | 10/1955 | Bennett | 43/42.47 |
| 2,760,294 | 8/1956 | Morrill, Jr. | 43/42.45 |
| 2,878,612 | 3/1959 | Netherton et al. | 43/42.47 |
| 3,956,847 | 5/1976 | Bayes | 43/42.45 X |
| 3,973,350 | 8/1976 | England | 43/42.03 |

Primary Examiner—Richard K. Seidel
Assistant Examiner—Patty E. Hong
Attorney, Agent, or Firm—Daryl W. Schnurr

[57] ABSTRACT

A fishing lure has a stream-lined elongated body generally simulating a fish. The body has a head and a tail and the tail is thin and curved to one side when the lure is in an upright position. Except for the curved tail, the lure is symmetrical about a vertical plane through a center of said body. There are two movable lateral fins located near the head, one lateral fin extending outward from each side of the body. The lateral fins are pivotally mounted at a forward edge thereof so that a rear edge of each lateral fin can rotate upward or downward relative to the forward edge. Upper and lower lugs limit the degree of rotation. In addition, there are two stationary rear fins located between the lateral fins and the tail, there being one rear fin extending from either side of the body. The lure has suitable hooks and two suspension points for attaching a fishing line. The lure is particularly suitable for ice fishing and still fishing and moves through the water in a circular manner when the fishing line is moved vertically upward or downward. The lateral fins impart a strong forward motion to the lure. Previous lures designed for ice fishing do not move nearly as quickly through the water or do not cut as wide a circle.

12 Claims, 1 Drawing Sheet

FISHING LURE WITH ROTATIONAL LATERAL FINS

BACKGROUND OF THE INVENTION

1. FIELD OF THE INVENTION

This invention relates to an artificial fishing lure and, in particular, to a fishing lure that can be moved through water in a circular motion during ice fishing or still fishing.

2. Description of the Prior Art

In U.S. Pat. No. 1,188,583 issued to E. C. Townsend on June 27th, 1916 there is described a decoy minnow that is said to move in a circular path when raised or lowered in the water. The decoy minnow has a tail with a plurality of blades, the tail rotating eccentrically as the decoy minnow moves through the water. The purpose of the decoy minnow described is to attract fish to its vicinity so that the fish may be speared by a fisherman. Unfortunately, the decoy minnow described in the Townsend patent and previous lures are not designed with sufficient forward thrust as the lure is raised or lowered in the water to reasonably simulate the movement of a small fish. With the decoy described in the Townsend patent there is much less forward thrust applied to the decoy as the fishing line is raised and lowered than with the lure of the present invention. The lure of the present invention is an improvement over the decoy described in the Townsend patent.

SUMMARY OF THE INVENTION

An artificial fishing lure is intended for use in water with a fishing line while ice fishing and still fishing. The lure has a stream-lined elongated body generally simulating a fish. The body has a head and a tail. The tail is thin and is curved to one side when the lure is in an upright position. Two movable lateral fins are located near the head, one lateral fin extending outward from each side of said body. Each lateral fin has a forward edge and a rear edge. Each lateral fin is pivotally mounted about a pivot point located approximately one-quarter of the distance from said head to said tail, said pivot point being located sufficiently close to the forward edge of each lateral fin so that a surface area of each lateral fin to the rear of the pivot point is such greater than a surface area of each lateral fin in front of said pivot point, each fin being mounted so that the rear edge rises relative to the forward edge when the lure moves downward and sinks relative to said forward edge when the lure moves upward. There are limiting means to limit a degree of rotation of said lateral fins in both directions and guide means located between said lateral fins and said tail. Hooks are suitably placed on said body and there are means for attaching a fishing line to said lure. The lateral fins are substantially parallel to one another at all times and impart a strong forward motion in an irregular circular path towards a side to which the tail is curved as the lure is moved upward or downward by means of the fishing line.

DESCRIPTION OF A PREFERRED EMBODIMENT

Figure 1:
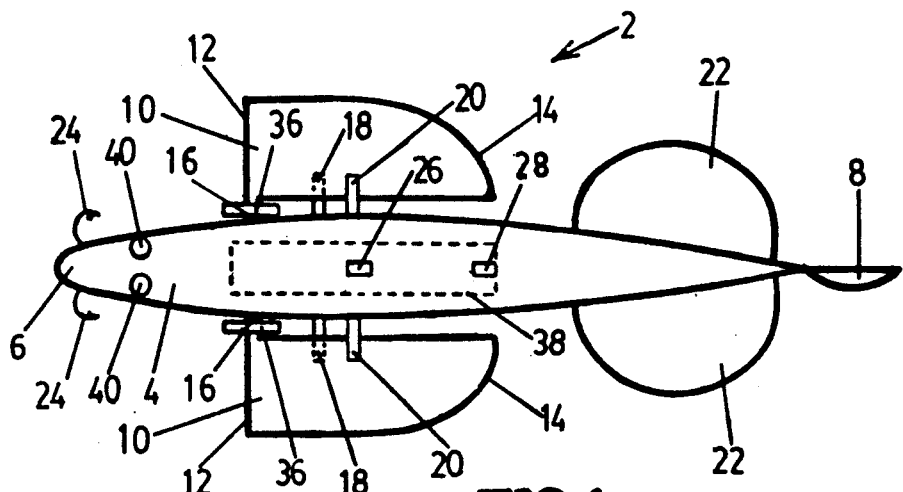
FIG. 1 is a top view of a lure.
Figure 2:
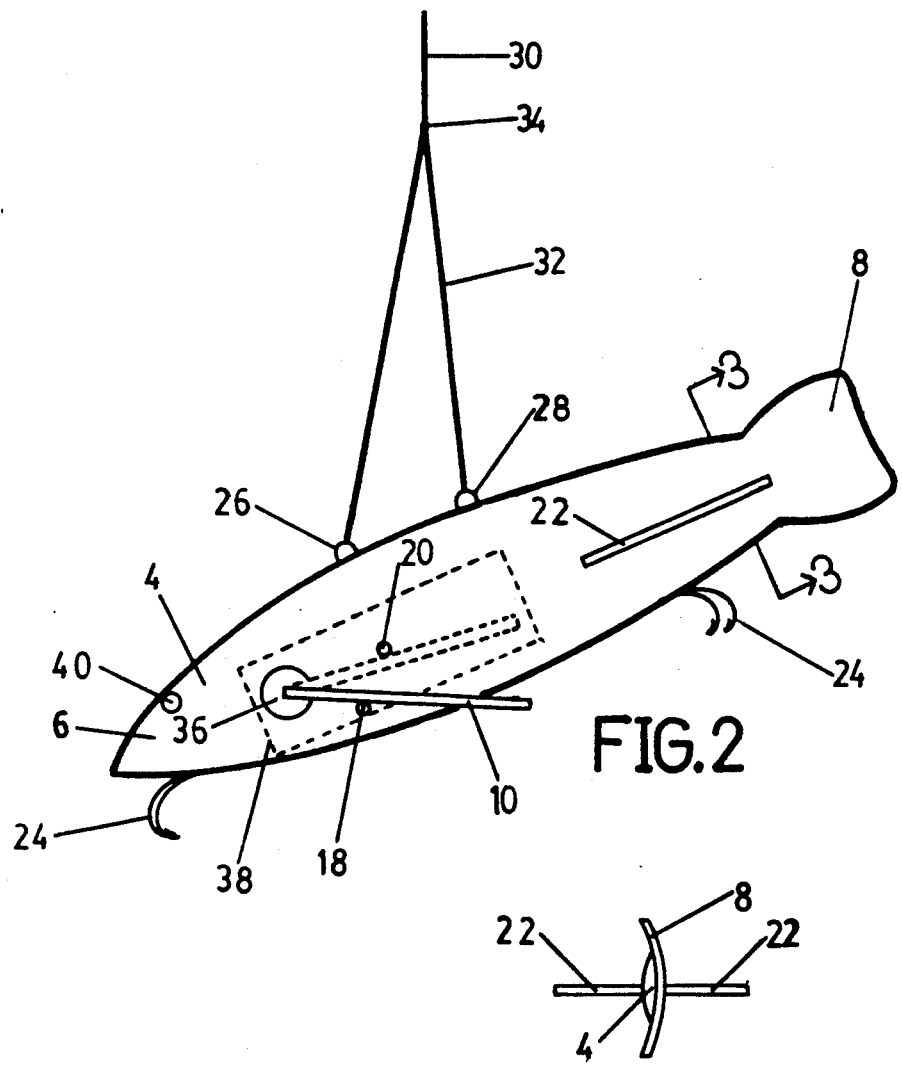
FIG. 2 is a side view of a lure connected to a fishing line.
Figure 3:
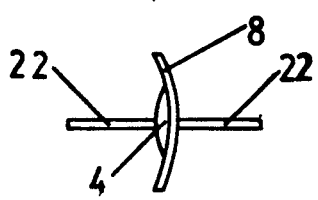
FIG. 3 is a partial end view of a tail of the lure.

In FIGS. 1, 2 and 3, a lure 2 has a stream-lined elongated body 4 to generally simulate a fish. The body 4 has a head 6 and a tail 8, said tail being thin and being curved to one side when the lure is in an upright position. The tail shown in FIGS. 1, 2 and 3 being curved to the left when the lure 2 is viewed from the rear. Two movable lateral fins 10 are located near said head 6, one lateral fin extending outward from each side of said body 4. Each lateral fin 10 has a forward edge 12 and a rear edge 14. Each lateral fin 10 is pivotally mounted about a pivot point 16 located approximately one-quarter of the distance from said head 6 to said tail 8. There are limiting means, being lugs 18, 20 to limit a degree of rotation of said lateral fins in both directions. There are guide means or rear fins 22 located between said lateral fins 10 and said tail 8. Hooks 24 are suitably placed on said body 4. Eyelets 26, 28 extending from said body 4 provide means for attaching a fishing line 30 to said lure through a secondary line 32. The secondary line is slidably connected to an end 34 of the fishing line 30.

At each pivot point 16, there is located a circular spacer 36 to prevent the fin 10 from scraping against the body 4. Preferably, the body 4 contains a central chamber 38 (as outlined by the dotted rectangular shape shown in FIGS. 1 and 2) in the area of the lateral fins, said chamber 38 containing a weight or weights. The weight or weights (for example, lead) for rapid sinking of the lure 2 in the water and are located in a forward portion of the body to maintain a forward centre of gravity in the lure. Depending on the material from which the lure is made, the size of the chamber 38 can be increased, reduced or eliminated entirely. To simulate a fish, the body 4 has two eyes 40 located on either side of said head 6.

From FIG. 3, it can be seen that the tail 8 is curved to one side by upper and lower portions of said tail being curved to form an arcuate shape for said tail, when viewed in cross-section.

Except for the curved tail 8, the lure 2 is symmetrical about a vertical plane through a centre of said body 4 when said lure 2 is in an upright position. The lateral fins 10 move in unison and are always parallel to one another. Each lateral fin is pivotally mounted so that the rear edge 14 rises relative to said forward edge 12 when the lure moves downward and sinks relative to said forward edge 12 when the lure moves upward. In this way, the upward or downward movement of the lure always imparts a strong forward motion to said lure. The curved tail causes the lure to move in an irregular circular path towards the side to which the tail is curved as the lure is moved upward or downward by means of the fishing line 30. The diameter of the circle travelled in the water will increase with the depth of immersion and the vertical length of the fishing line. The lure 2 shown in the drawings with the tail curved towards the left side when viewed from the rear will move in a generally clockwise circular motion. Alternatively, the tail could be curved in a different manner to impart a circular motion, within the meaning of the attached claims.

The rear fins 22 are located in the space between the lateral fins 10 and the tail 8. The rear fins 22 are identical to one another and the lateral fins 10 are identical to one another. The rear fins are substantially parallel to one another and prevent the tail from rising more rapidly than the head when the lure is lifted in the water and prevent the tail from dropping more rapidly than the head when the lure is lowered in the water. When the lure is moved upward in the water, the rear fins 22 keep the tail from moving upward relative to the head 6, which moves upward before the tail moves upward. When the lure is moved downward in the water, the fins 22 keep the tail from moving downward relative to the head 6, which moves downward first before the tail does.

The surface area of the rear fins is slightly less than the surface area of the pivoting fins. The movement of the head relative to the tail during vertical movement of the lure in the water is determined by the rear fins, the points of attachment of suspending eyes to the lure, the centre of gravity of the lure and the pivoting fin angle.

The lugs 18, 20 for each lateral fin 10 provide limiting means for said fins 10. The lower lug 18 limits the degree of rotation of the lateral fin in the downward direction and the upper lug 20 limits the degree of rotation in the upper direction. As can be seen from FIG. 2, the lugs 20, 18 are mounted to limit the degree of rotation from an upper position substantially parallel to a longitudinal axis of said body to a lower position substantially 18° below said upper position. While the lure will work with other ranges of limitations of the degree of rotation, the range specified is a preferred range.

The two suspension points 26, 28 allow the lure 2 to rotate in a vertical direction relative to the fishing line 30. For example, as previously stated, when the line is pulled upward, the head portion of the lure will tilt above the tail portion as the line 32 slides rearward through the end 34 of the line 30. Similarly, when the line 30 is lowered, the head portion will tilt downward relative to the tail 8 as the line 32 slides forward through the end 34 relative to the fishing line 30.

It has been found that the lure of the present invention makes an extremely wide general circle relative to the depth of immersion when used in fishing. The wide circle ensures a greater coverage and increases the chances that the lure will attract a fish. Also, the lure does not move in a smooth circle but in an erratic circle similar to the manner in which a fish would move. Further, the lure would not operate satisfactorily without the movable lateral fins as the rotation of the fins provides additional forward thrust to the lure as the fishing line is moved upward and downward.

What I claim as my invention is:

1. An artificial fishing lure intended for use in water with a fishing line while ice fishing and still fishing, said lure comprising a stream-lined elongated body generally simulating a fish, said body having a head and a tail, said tail being thin and being curved to one side when the lure is in an upright position, two movable lateral fins located near said head, one lateral fin extending outward from each side of said body, each lateral fin having a forward edge and a rear edge, each lateral fin being pivotally mounted about a pivot point located approximately one-quarter of the distance from said head to said tail, said pivot point being located sufficiently close to the forward edge of each lateral fin so that a surface area of each lateral fin to the rear of the pivot point is much greater than the surface area of each lateral fin in front of said pivot point, each lateral fin being mounted so that said rear edge rises relative to said forward edge when the lure moves downward and winks relative to said forward edge when the lure moves upward, limiting means to limit a degree of rotation of said lateral fins in both directions, guide means being located between said lateral fins and said tail, hooks suitably placed on said body, and means for attaching a fishing line to said lure, said lateral fins being substantially parallel to one another at all times and imparting a strong forward motion in an irregular circular path towards the side to which the tail is curved as the lure is moved upward or downward by means of the fishing line.

2. A lure as claimed in claim 1 wherein, except for said curved tail the lure is symmetrical about a vertical plane through a centre of said body when said lure is in an upright position.

3. A lure as claimed in claim 2 wherein the lateral fins have a forward edge and pivot about said forward edge.

4. A lure as claimed in claim 3 wherein the limiting means for the lateral fins are four lugs, two lugs for each fin, one lug limiting the degree of rotation of one fin in one direction and the other lug limiting said degree of rotation in the other direction.

5. A lure as claimed in claim 4 wherein the guide means is two stationary rear fins, one rear fin extending from either side of said body.

6. A lure as claimed in claim 5 wherein the tail is curved to one side by upper and lower portions of said tail being curved so that the tail has an arcuate shape when viewed in cross-section.

7. A lure as claimed in claim 6 wherein the lugs are mounted to limit the degree of rotation from an upper position substantially parallel to a longitudinal central axis of said body to a lower position approximately 18° below said upper position.

8. A lure as claimed in claim 7 wherein the lateral fins are identical to one another and the rear fins are identical to one another.

9. A lure as claimed in claim 8 wherein the body has two suspension points of the fishing line.

10. A lure as claimed in claim 9 wherein the two suspension points are located so that the lure tips slightly forward in a rest position.

11. A lure as claimed in claim 10 wherein the body contains a central chamber located in the area of said lateral fins that is filled with lead, said lead resulting in the lure having a forward centre of gravity.

12. A lure as claimed in claim 3 wherein each rear fin has a sufficient surface area to slow the rate of ascent or descent of the tail relative to the head when the lure is raised or lowered in the water respectively.

* * * * *